United States Patent [19]
Schinzel et al.

[11]  4,168,251
[45]  Sep. 18, 1979

[54] PLASTIC-WOOD POWDER MIXTURE FOR MAKING INSULATING MATERIAL FOR THE ELECTRICAL INDUSTRY

[75] Inventors: Hartmut Schinzel, Münchberg; Ernst Wunderlich, Hof, both of Fed. Rep. of Germany

[73] Assignee: Rehau Plastiks AG & Co., Rehau, Fed. Rep. of Germany

[21] Appl. No.: 877,796

[22] Filed: Feb. 13, 1978

Related U.S. Application Data

[63] Continuation-in-part of Ser. No. 777,693, Mar. 15, 1977, abandoned.

[51] Int. Cl.² .............................................. C08L 1/02
[52] U.S. Cl. ........................... 260/17.4 R; 174/110 R; 174/110 B; 174/110 SR; 174/110 SY; 174/110 V; 428/379; 428/463
[58] Field of Search ............. 260/17.4 R; 174/110 R, 174/110 B, 110 SR, 110 SY, 110 V

[56]  References Cited
U.S. PATENT DOCUMENTS

| 2,179,973 | 11/1939 | Alexander | 174/110 V |
| 2,394,550 | 2/1946 | Jensen | 260/17.4 R |
| 3,962,531 | 6/1976 | Lever et al. | 174/110 SR |

OTHER PUBLICATIONS

Electrical Manufacturing, Richardson, et al., Apr. 1953, "Plastics Dielectric Properties".
Modern Plastics International, Feb. 1974, pp. 22–24.

Primary Examiner—Edward M. Woodberry
Attorney, Agent, or Firm—Spencer & Kaye

[57]  ABSTRACT

A method of forming an electrically insulating material having good mechanical properties by mixing a polyvinyl chloride polymer with a natural cellulose material in an amount of from 25 to 30% by weight to form a substantially homogeneous mixture consisting essentially of the polyvinyl chloride and natural cellulose material.

5 Claims, No Drawings

PLASTIC-WOOD POWDER MIXTURE FOR MAKING INSULATING MATERIAL FOR THE ELECTRICAL INDUSTRY

CROSS-REFERENCE TO RELATED APPLICATION

This application is a continuation-in-part of co-pending application Ser. No. 777,693 filed Mar. 15, 1977 now abandoned.

BACKGROUND OF THE INVENTION

It is known that the incorporation of wood meal, cellulose fibers and other cellulose based fillers and reinforcing substances in thermoplastic polymers significantly improves a number of mechanical properties in products made of such mixtures. For example, the modulus of elasticity of such mixed products can be increased up to triple the modulus of elasticity of the starting thermoplastic polymer material, depending on the amount of wood meal involved and on the particular thermoplastic polymer material employed. Such a value can be reached, for example, with the use of an impact resistant polystyrene containing 60% wood meal.

It is also known that the bending strength of such mixed products can be improved to over twice the value of the unfilled polymer. A further known advantage of products made from a mixture of a thermoplastic polymer material and wood meal is that the coefficient of thermal expansion of these products are reduced by about 50% and, moreover, as extruded profiles, they exhibit less tendency to shrink at higher temperatures.

All these improvements are of a mechanical nature and impart broad applicability to such products. The improved properties attained are attributable to the particular mixture from which the products are made and are generally not realized to such an advantageous degree from comparable products made completely of the unfilled thermoplastic polymer.

The publication "Kunststoffe" ["Plastics"], in volume 65 (1975), on pages 69 et seq. and particularly on page 71, discloses the quantities of wood meal that are considered suitable for the extrusion of various thermoplastics. For example, an addition of 30% wood meal is proposed for the extrusion of high pressure polyethylene at a mass temperature of 180° C. For polypropylene, at the same mass temperature, the proportion increases to 70% wood meal while for polystyrene, at a mass temperature of 200° C., the use of up to 60% wood meal is suggested. Further, according to this reference, polyvinyl chloride, at a mass temperature of about 160° C., is able to handle only a 20% portion of wood meal.

While the addition of wood meal to thermoplastic polymers in the above-mentioned quantity ranges produces a favorable increase in mechanical properties of extruded profiles or injection molded pieces over pieces formed from non-filled thermoplastics, the filling of such polymers with the respective amounts of wood meal considerably reduces their electrical insulating values. As a result, profiles or molded pieces filled with wood meal or other cellulosic material have not been previously used as insulating material in the electrical industry.

The publication "Modern Plastics International", Feburary, 1974, at pages 22 to 24 discloses PVC-wood flour mixtures containing 33% wood flour. A number of uses are disclosed for such mixtures, but use as an insulating material in the electrical industry is not disclosed.

SUMMARY OF THE INVENTION

The object of the present invention is to provide mixtures of thermoplastic polymers and natural cellulosic materials which, in addition to exhibiting improved mechanical properties, have electrically insulating behaviors of the profiles and molded pieces formed therefrom which are equal to or approximately equal to the electrical insulating behavior of the comparable unfilled polymer profiles and molded pieces.

A further object of this invention is to provide a method for forming an electrically insulating product.

According to the present invention, the desired objects are accomplished by forming a substantially homogeneous mixture consisting essentially of a polyvinyl chloride polymer with between 25 and 30% by weight of a natural cellulose material based on the weight of the polyvinyl chloride and natural cellulose material.

DETAILED DESCRIPTION OF THE INVENTION

The present invention is directed to forming materials having improved mechanical properties which are suitable as insulating materials in electrical applications. The insulating materials of the present invention are formed from a mixture consisting essentially of a polyvinyl chloride polymer and a natural cellulosic material, preferably wood meal.

The thermoplastic polyvinyl chloride polymers found suitable in the present invention are homopolymers of polyvinyl chloride and copolymers of polyvinyl chloride. For example, the polyvinyl chloride copolymer preferably contains at least 80% polyvinyl chloride and can be an ethylene vinyl acetate/PVC copolymer with a proportion of ethylene vinyl acetate up to 10%, or a mixture of PVC and chlorinated polyethylene containing chlorinated polyethylene up to 20%. Thermoplastic polymers which have formed the basis of plastic-wood mixtures in the past, such as polyethylene, polypropylene and polystyrene, are not used in the practice of the present invention.

The unfilled thermoplastic polyvinyl chloride polymers have suitable insulating properties for electrical application and are capable of forming an insulating product by conventional extrusion or injection molding techniques. For example, the thermoplastic polyvinyl chloride polymers have a glass transition temperature which is sufficiently low to form a fluid mass which enables it to be mixed with the natural cellulose material and be processed into the desired product at the temperatures discussed herein below. Wood meal (sawdust) or other natural cellulose material, such as cotton, can be used in the instant invention. The preferable material is commercially available wood meal. The material should have a particle size which is less than 500/$\mu$ and be present in from 25 to 30 percent by weight of the resultant mixture of PVC and natural cellulose material.

When hard (rigid) polyvinyl chloride is used as the polymer carrier, a proportion of 25 percent wood meal has been found to be advantageous.

Further, it is advantageous for the particles of cellulosic material, such as wood meal, to be brought to a moisture content of less than 0.1 percent by weight by drying such material by a conventional method prior to mixing with the polymer. This order of magnitude is advisable since electrical sparkovers, which could be produced by employing cellulosic particles such as wood meal, of a higher moisture content, must be positively avoided when the material is used in areas carrying electrical current.

The components of the mixture should not be capable of sustaining a chemical reaction between them which would impede the processability and utility of the mixture formed. Further, the polymer and the filler, preferably, should not contain components which are volatile below or at the processing temperature. The thermoplastic polyvinyl chloride polymer used in the instant invention should be sufficiently stable to undergo the processing temperatures of the present process. For example, the polyvinyl chloride should have a thermal stability against HCl degradation of 15 minutes at 200° C.

In addition, conventional additives, such as stabilizers, colorants, antioxidants and the like can be incorporated into the thermoplastic polymer in conventional amounts and manners either prior to or during the mixing of the polymer with the wood meal or other natural cellulose material. The total weight of these conventional additives in the mixture generally is less than about 10% based on the total weight of the mixture.

In addition to these additives, mineral fillers, e.g. calcium carbonate, can be incorporated in conventional amounts.

The poor electrical insulating behavior of the extruded profiles and molded pieces made according to the state of the art from mixtures of plastic and wood meal is a result of the amounts of wood meal used in these mixtures. If the amount of filler is high, the wood meal particles are not completely encased in the plastic carrier material; rather, there exists a possibility of mutual contact between the wood particles, and thus electrical bridges could be formed.

These drawbacks are prevented by the disclosed mixing ratio between the thermoplastics employed and the wood meal or other natural cellulose component. The mixture produced according to the teaching of the invention must be thoroughly mixed through before it is finally processed in order that balling together of a portion of the wood meal filler is prevented. The mixture must be formed so that the wood meal particles are completely encased by the polyvinyl chloride polymers which are used as carriers so as to prevent electrical sparkovers.

The mixing can be done with any conventional mixer, such as a sigma blade or banbury mixer, in which the polymer is heated above its softening point, preferably at 120° to 130° C. The mixing period should be of sufficient duration to permit substantially homogeneous distribution to be achieved and that volatile materials are no longer released. The resulting mixture is cooled preferably to a temperature of from about 40° to 50° C., and formed into a dry blend or granulate.

A desired insulating product can be formed by conventional extrusion or injection molding techniques from a charge of the resultant dry blend or granulate. The product is preferably formed by conventional extrusion techniques at from 150° to 200° C.

A typical unfilled thermoplastic polyvinyl chloride polymer which is suitable for use in the method of the present invention has properties listed in Table I below:

It was found that with an amount of 20% wood meal the modulus of elasticity according to DIN 53 457 is only 3400 N/mm$^2$ and thus almost approaching the range of not reinforced PVC. Further, we have determined that at a portion of 33% wood meal the specific volume resistance according to DIN 53 482 was only $10^{11}$ Ohm. From this we must conclude that with this higher wood meal concentration a certain amount of electrical bridges is already present.

TABLE I

|  | Polyvinyl chloride |  |
|---|---|---|
| molecular weight | 60–66 × 10$^3$ |  |
| tensile strength (DIN 53 455) | 48–55 | N/mm$^2$ |
| elongation at rupture 15–30 (DIN 53 455) | % |  |
| bending stress limit (DIN 53 452) | 85–100 | N/mm$^2$ |
| modulus of elasticity (DIN 53 457) | 2700–3000 | N/mm$^2$ |
| notch impact strength (DIN 53 453) | 2–30 | KJ/m$^2$ |
| dimensional stability according to Vicat (Method B) (DIN 53 460) | 75–88 | °C. |
| coefficient of thermal conductivity (+20°) | ca 0.6–0.7 | KJ/mhK |
| coefficient of linear thermal expansion | 1 × 10$^{-4}$ to 80 × 10$^{-6}$ | K$^{-1}$ |
| specific volume resistance (DIN 53 482) | ca 10$^{16}$ | Ohm × cm |
| surface resistance (DIN 53 482) | ca 10$^{11}$–10$^{13}$ | Ohm |
| puncture strength (DIN 53 481) | 20–50 | KV/mm |
| DIN (German Industrial Standard) |  |  |

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE I

An experimental bus bar for insertable current conductors was extruded according to the following recipe:

100 parts S-PVC (suspension PVC) with a K value of 65;

35 parts soft wood meal Lignocell C-250 of a grain size of 0.16 to 0.25 mm (160–250/µ);

2 parts dibasic lead sulfate;

1.4 parts dibasic lead stearate;

0.8 parts ester resin (a natural fatty acid ester mixture of whale fat which comprises, for the major part, cetyl palmitate);

0.2 parts stearic acid;

0.6 parts calcium stearate; and 1.5 parts polymethyl methacrylate.

The individual components and the wood meal, which had a moisture content of less than 0.1%, were mixed in a dry mixer at 120° C. to 130° C. for about 20 minutes to form a substantially homogeneous mixture, the mixture was cooled to 40° C., and then extruded in a strand and granulated. The granulate was extruded in an extruder having a degasification device at a mass temperature of about 106° C.

The profile obtained from the extrusion had the following properties:

1. leakage current resistance according to VDE 0303 Section 1/10.72: stage KC 550 (VDE standing for Verein Deutscher Elektrotechniker, in translation, Association of German Electrical Engineers.);

2. insulation resistance, tested according to VDE "Vorläufige sicherheitstechnische Anforderungen für Stromschienen für Leuchten für Nennspannungen bis 380 V" ["Provisional safety requirements for bus bars in lighting fixtures for rated voltages up to 380 V"], paragraph 3.7: 160 megaohm per meter of conductor length measured between pairs of conductors;

3. bending modulus according to DIN 53 457: 4,500 N/mm$^2$;

4. coefficient of thermal expansion: $3.8 \times 10^{-5} \times K^{-1}$; and 5. shrinkage test according to VDE "Vorläufige sicherheitstechnische Anforderungen für Stromschienen für Leuchten für Nennspannungen bis 380 V" [in translation, "Provisional safety requirements for bus bars in lighting fixtures for rated voltages up to 380 V"], paragraph 3.4:0.5%.

In addition to the known advantages of increasing the mechanical values, excellent electrical values are attained which make the pieces formed optimally suitable for use as insulation materials in the electrical industry.

The following Table II is representative of PVC and its copolymers, filled with wood meal, and produced according to the process of the present invention.

TABLE II

| | PVC Filled With Wood Meal, 25 to 30% by weight | |
| --- | --- | --- |
| molecular weight | $60-66 \times 10^3$ | |
| tensile strength (DIN 53 455) | 40–53 | N/mm$^2$ |
| elongation at rupture (DIN 53 455) | 10–26 | % |
| bending stress limit (DIN 53 452) | 60–98 | N/mm$^2$ |
| modulus of elasticity (DIN 53 457) | 4000–6000 | N/mm$^2$ |
| notch impact strength (DIN 53 453) | 0.5–10 | KJ/m$^2$ |
| dimensional stability according to Vicat Method B (DIN 53 460) | 78–88 | °C. |
| coefficient of thermal conductivity (+20°) | ca 0.6–0.7 | KJ/mhK |
| coefficient of thermal expansion (linear) | $1 \times 10^{-5}$ to $80 \times 10^{-6}$ | $K^{-1}$ |
| specific volume resistance (DIN 53 482) | ca $10^{14}$ | Ohm × cm |
| surface resistance (DIN 53 482) | ca $10^{11}$–$10^{13}$ | Ohm |
| puncture strength (DIN 53 481) | >12 | KV/mm |

Current bus bars for ceiling lights were made from PVC mixtures according to the present invention. The modulus of elasticity of such current bus bars was 4400 N/mm$^2$ for mixtures of PVC with 25% wood meal.

Cable shaft covers were made from PVC mixtures according to the present invention. The dimensional stability of such cable shaft covers were determined according to Vicat B$^{50}$, and for mixtures which contained 25% wood meal, the dimensional stability was 84° C.

It will be understood that the above description of the present invention is susceptible to various modifications, changes and adaptations and the same are intended to be comprehended within the meaning and range of equivalents of the appended claims.

What is claimed is:

1. A composition suitable for making an electrical insulator consisting essentially of substantially homogeneous mixture of a polymer containing at least 80% polyvinyl chloride, with a natural cellulose material; said natural cellulose material being from 25 to 30 percent by weight of the polyvinyl chloride and natural cellulose material, and having a particle size of less than 500μ.

2. The composition of claim 1 wherein the natural cellulose material is wood meal.

3. The composition of claim 1 wherein the moisture content of the natural cellulose material is less than 0.1 percent.

4. The composition of claim 2 wherein the cellulose material is wood meal, said wood meal being present in about 25 percent by weight of the mixture.

5. The composition of claim 2 wherein the cellulose material is wood meal, said wood meal being present in 25 to 30 percent by weight of the mixture.

* * * * *